Jan. 6, 1970 A. H. FAULKNER ET AL 3,488,641

COINCIDENT CURRENT READ ONLY MEMORY
USING LINEAR MAGNETIC ELEMENTS
Filed Aug. 24, 1965

INVENTORS
Alfred H. Faulkner &
Hayden A. Nelson
BY
Thomas N. Young
ATTORNEY

United States Patent Office
3,488,641
Patented Jan. 6, 1970

3,488,641
COINCIDENT CURRENT READ ONLY MEMORY USING LINEAR MAGNETIC ELEMENTS

Alfred H. Faulkner, Redondo Beach, and Hayden A. Nelson, Torrance, Calif., assignors to General Motors Corporation, Detroit, Mich., a corporation of Delaware Filed Aug. 24, 1965, Ser. No. 482,160
Int. Cl. G11b 5/00
U.S. Cl. 340—174 1 Claim

ABSTRACT OF THE DISCLOSURE

A fixed information coincident current memory including a plurality of saturable closed magnetic flux paths each having a substantially linear magnetic characteristic. A data drive winding links selected ones of the flux paths and is energizable so as to at least partially saturate the flux paths. A read drive winding links each of the flux paths and is energizable after the data drive winding is energized so as to induce a relatively large magnetic flux change in the unsaturated flux paths. A sense winding links each of the flux paths so as to detect magnetic flux changes in the flux path when the read drive winding is energized.

This invention relates to pre-wired, fixed information memory systems for computing apparatus and more particularly to such a memory system in which stored information is read out by the application of a coincident current selection technique to magnetic flux paths constructed of linear magnetic material.

There are several forms of so-called wired core, fixed information memories. Wired core memories are distinguished from the usual computer memory in that in the former type information is permanently stored in the physical configuration of the drive or sense windings whereas in the latter type information is magnetically stored in individual magnetic storage elements, the winding configuration being essentially the same for each element. One advantage of a wired core memory is that the information is not subject to destruction by a change in the remanent magnetic state of the cores. On the other hand, it is obvious that the information content of a wired core memory cannot be easily changed since at least partial re-wiring would invariably be required. Nevertheless there are many instances where a fixed information memory is suitable, and in such instances a wired core, fixed information memory may be advantageously employed.

Characteristically the functions of a digital memory are dependent upon the magnetic flux retentivity or hysteresis of the cores used therein. In a core of square loop material, the remnanent states of opposite polarity may represent different binary values generally designated as "zero" and "one." Whenever a core is switched from one remanent state to the other, it must necessarily be switched back to the original state before it may again be used to convey information. In addition, the application of coincident current selection techniques to highly remanent cores requires precise regulation of drive current to ensure that the flux state of a core is switched only when a coincidence of drive current occurs at that core.

In accordance with the present invention, a fixed information memory employing a form of coincident current selection may be constructed using means such as saturable magnetic cores for defining closed flux paths wherein such means are constructed of linear magnetic material; that is, the cores do not exhibit a significant hysteresis characteristic. Resulting from the use of linear magnetic material, the stored information may be rapidly read out without the need for precise current regulation or flux resetting apparatus. In general this is accomplished by the provision, in combination with means defining an array of closed saturable flux paths of substantially linear material, of means for first at least partially saturating a coded combination of the flux paths which combination represents information stored in the memory, and drive means for secondly subjecting all of the flux paths to a flux inducing field. On the occurrence of the flux inducing field involved in the second step above, it may be seen that all of the previously unsaturated paths will experience a relatively large flux change whereas the previously saturated flux paths will experience a relatively small flux change. Sensing means may be associated with the various flux paths for producing signals representing the degree of flux change in each of the cores and thus representing the data combination which it is desired to read from the memory.

In a particular embodiment of the invention, a word oriented memory using coincident current selection techniques may be constructed using an array of substantially linear magnetic cores, and a combination of drive lines which may be coincidently energized to produce signals representative of digital information stored in the wiring configuration. This drive line combination includes at least one data drive line which links only those cores in the array where signals of one character, for example "zero," are to be produced and bypasses those cores where signals of another character, for example "one," are to be produced. The combination further includes at least one word drive line which links all of the cores in the array. Upon energization of the data drive line, the linked cores are at least partially saturated whereas the bypassed cores remain in an unmagnetized condition. Upon subsequent energization of the word drive line, only the fully unsaturated cores produce a large flux change and this flux change is sensed by means of sense lines to produce a combination of signals representing the information stored in the memory by virtue of the data drive line linking configuration.

The invention may be best understood by reference to a detailed description of a specific embodiment thereof. Such a description is given in the following specification which is to be taken with the accompanying figures of which:

Referring to the figures, there is shown a specific embodiment of the invention in the form of a wired core, fixed information memory employing coincident current selection techniques for reading information from the memory in a parallel fashion; which is to say that all bits of a word are read at once. This embodiment employs a two-dimensional array of magnetic cores constructed of substantially linear transformer type material and conveniently arranged in rows and columns. It will be understood that the designation of rows and columns is purely arbitrary and used for the purpose of convenience in the detailed description given. Further, it will be understood that the term "two-dimensional" refers to the number of axes in the selection and sensing circuitry rather than to the physical arrangement of the magnetic cores.

Figure 1:
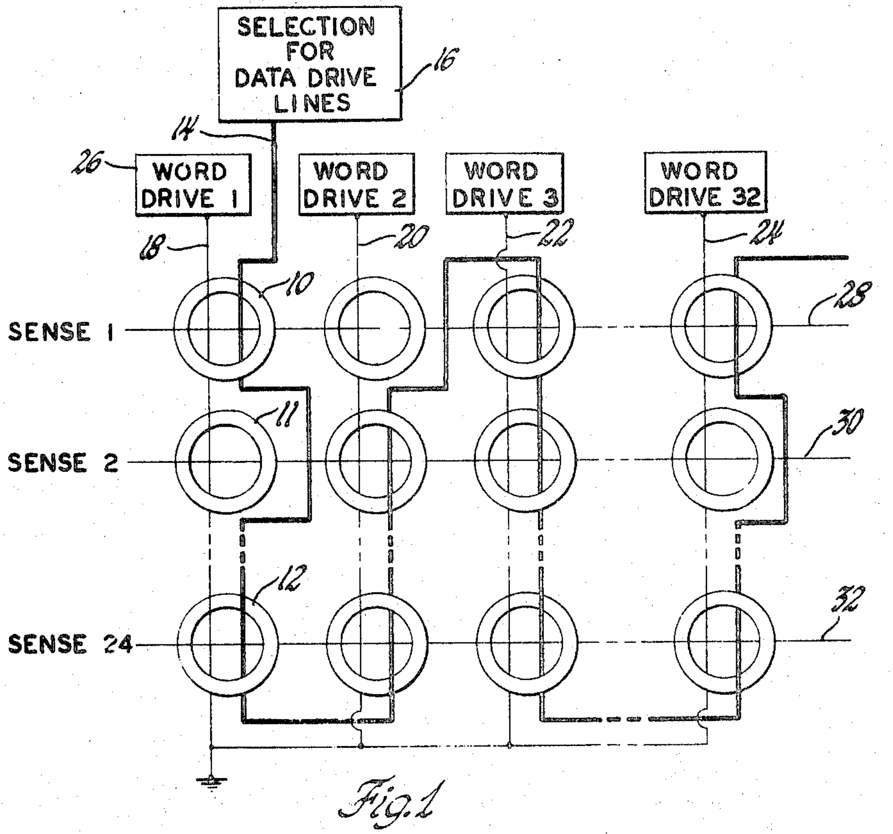
FIGURE 1 is a schematic diagram of a representative portion of a memory employing the invention.

Referring specifically to FIGURE 1, the embodiment is shown to comprise a two-dimensional array of toroidal magnetic cores such as 10, 11 and 12. All of the cores in the array are as nearly as possible identical but for the sake of convenience only cores 10, 11 and 12 in the left-handmost column of cores are numbered. The array is divided into horizontal rows and vertical columns by virtue of the selection circuitry to be described. In the specific embodiment shown, each column contains 24 cores and each row contains 32 cores. This geometry is, of course, illustrative only and is not to be construed in a limiting sense. The coincident current selection system for reading information from the memory is shown to include a bundle 14 of 128 data drive lines which are threaded column-wise throughout the array of cores. Each data drive line in the bundle 14 may be threaded through a different combination of cores in each of the 32 columns and thus may represent up to 32 words of stored information. In accordance with the invention, each data drive line links only those cores in a word-column where a "zero" signal is to be produced and bypasses those cores in a column which are to be used in representing a "one" in the particular word. It can be readily calculated that with the use of 128 data drive lines in the memory employing 32 word-columns as shown, 4,096 words may be stored in the memory. Since each word-column has 24 cores, each word may be 24 bits long. Again, these numbers are purely illustrative and in no wise limit the invention to the particular specifications given. The bundle 14 of data drive lines is connected to a selection unit 16 which is used to select and energize the particular data drive line which is to be used in reading a particular word of information.

Each of the 32 columns of cores is also threaded by a word drive line which links all of the cores in a particular column in a sense such that flux produced by an energized word drive line is in the same direction as that produced by an energized data drive line linking that core. Word drive line 18 links each of cores 10, 11 and 12 in the left-handmost column shown in FIGURE 1. In addition, word drive lines 20, 22 and 24 link all of the cores in the respective columns associated with those word drive lines. Each word drive line may be connected on one side to a drive unit such as 26 which is used to select and energize the associated word drive line. Each of the word drive lines 18, 20, 22 and 24 may be grounded on the other side as shown in FIGURE 1. This simplified representation may be only illustrative, as the decoding and selection circuitry used may vary according to the needs of the particular application.

In the specification embodiment shown in FIGURE 1, the bits of information in a word are read out in parallel fashion. Accordingly sense lines 28, 30 and 32 link each of the cores in respective horizontal rows in the array. The sense lines are responsive to flux changes in the cores linked thereby to produce voltages representing bits of information for general computation purposes. It is to be understood that in the specific embodiment with 24 cores per column, 24 sense lines will be employed.

Figure 2:
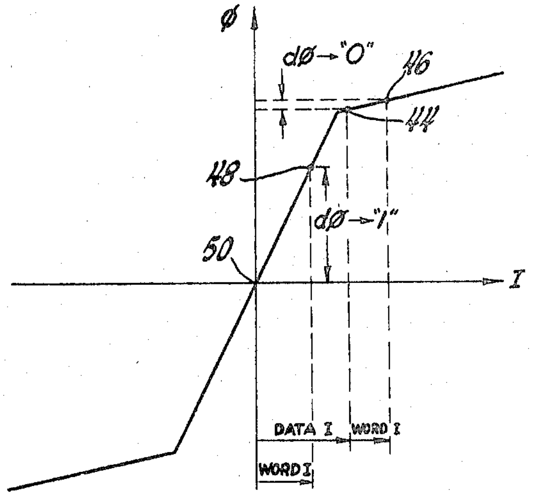
FIGURE 2 is a diagram showing the idealized magnetic characteristics of the cores employed in the memory of FIGURE 1.

Each of the magnetic cores shown in FIGURE 1 is constructed of a substantially linear magnetic material such as linear ferrite and exhibits a magnetic characteristic such as is shown in FIGURE 2. This idealized magnetic characteristic exhibits very little hysteresis and a reasonably sharp saturation threshold indicated by the abrupt discontinuity in the characteristic shown in FIGURE 2. Accordingly, a core may be induced into a state of at least partial saturation by the passage of drive current through one of the drive lines linking the core. However, upon relaxation oft his current, the flux state of the core returns to the initial unmagnetized condition.

Figure 3:
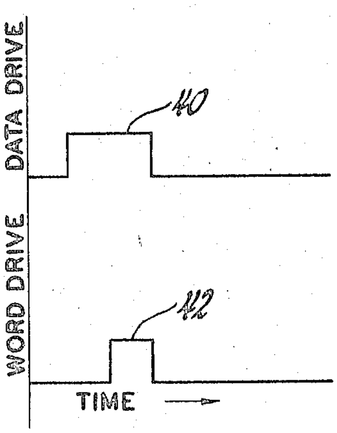
FIGURE 3 is a diagram of the energization signals used in the various drive lines of the embodiment of FIGURE 1.

Describing the operation of the circuit of FIGURE 1, the magnetic characteristic shown in FIGURE 2, as well as the energizing pulse timing diagram shown in FIGURE 3, will be referred to.

Each of the cores in the array normally exists in an unmagnetized condition. Upon selection and energization of one of the data drive lines in bundle 14, representing one of 32 possible words which might be read by energization of this data drive line, each of the cores in the array which are linked by the selected data drive line will experience an induced flux change due to the passage of a current pulse 40 through the selected data drive line. This data drive pulse partially saturates the linked cores represented at point 44 on the magnetic characteristic of FIGURE 2. A greater amount of current more completely saturating the cores may also be employed. On the other hand, those cores which are bypassed by the selected data drive line experience no flux change. To complete the selection of the wosd to be read, the word drive line of the particular column in which that word appears must be energized with a word drive pulse 42. Upon this occurrence, all of those previously partially saturated cores residing in states represented by point 44 experience only a small flux change by moving along the characteristic to point 46. This small change of flux with respect to time is representative of a "zero." On the other hand, all of the fully unsaturated cores in the column, that is, those cores which are bypassed by the energized data drive line, experience a large flux change indicated by the distance from the origin 50 of the diagram of FIGURE 2 up to point 48. This large flux change is representative of a "one." The changes in flux occurring over the rise times of pulses 40 and 42 induce by transformer action voltages in the sense lines linking the cores. The magnitudes of the voltages are proportional to the change of flux with respect to time in those cores. Data sensing is accomplished during the rise of word drive pulses. During this rise time, a relatively large voltage pulse is induced in each of the sense lines which links a "one" core whereas a comparatively small voltage pulse is induced in those cores representative of a "zero." By amplitude discrimination of the voltage pulses produced coincidently with the application of the word drive energizing pulse 42, a combination of "ones" and "zeros" representative of a word of information may be read from the memory. It should be noted that the word drive pulse 42 follows data drive pulse 40 to prevent data current noise from affecting the sensed outputs.

As a specific example, let it be assumed that a word having 3 bits is to be read from the column of the array comprising cores 10, 11 and 12. Let it be further assumed that the word to be read from this column is the binary number 010. In accordance with the previous explanation, the data drive line in bundle 14 which represents the binary word 010 links cores 10 and 12 but bypasses core 11. Upon application of a data drive pulse 40 to the data drive line in bundle 14, the "zero" cores 10 and 12 are moved along the flux characteristic to point 44 shown in FIGURE 2. The bypassed core 11 has no flux induced therein by current through the data drive line. Upon application of a word drive pulse 42 to the word drive line 18, previously saturated cores 10 and 12 are moved from point 44 to point 46 on the flux characteristic producing a small flux change with respect to time. This small flux change induces only comparatively small voltages in sense lines 28 and 32. On the other hand, the fully unsaturated core 11 experiences a comparatively large flux change with respect to time by moving from the origin 50 to point 48 on the flux characteristic of FIGURE 2. A proportionately large voltage is induced in sense line 30 indicating the presence of a "one." During the word drive pulse rise time, the three digits 010 are accordingly read out in the form of voltages of different magnitudes on sense lines 28, 30 and 32, respectively.

It is to be understood that the foregoing description refers only to an illustrative embodiment of the invention and that various modifications to this embodiment may occur to those skilled in the art and hence the description is not to be construed in a limiting sense. For a definition of the invention reference should be had to the appended claim.

We claim:

1. A fixed information coincident current memory comprising: a plurality of toroidal magnetic cores arranged in a two-dimensional array of rows and columns, the magnetic cores exhibiting a linear magnetization curve having substantially no hysteresis and a relatively sharp saturation threshold so as to normally reside in an unmagnetized condition; at least one data drive line linking ones of the magnetic cores where no voltage signal is to be produced and bypassing ones of the magnetic cores where a voltage signal is to be produced; a plurality of word drive lines each linking all of the cores in a different one of the columns; means connected with the data drive line for energizing the data drive line with a first coincident current pulse of a first polarity so as to at least partially saturate the magnetic cores linked by the data drive line; means connected with the word drive lines for energizing one of the word drive lines with a second coincident current pulse of the first polarity after the data drive line has been energized so as to provide a relatively large flex change only in the fully unsaturated magnetic cores in the linked column; and a plurality of sense lines each linking all of the magnetic cores in a different one of the rows for producing a voltage signal in response to a relatively large flux change occurring in one of the magnetic cores in the linked row; whereby after the coincident current pulses have dissipated the magnetic cores automatically return to an unmagnetized condition.

References Cited

UNITED STATES PATENTS

| | | | |
|---|---|---|---|
| 3,215,992 | 11/1965 | Schallerer | 340—174 |
| 2,968,029 | 1/1961 | Grosser | 340—174 |
| 3,396,373 | 8/1968 | Didic | 340—174 |
| 3,319,234 | 5/1967 | Brette | 340—174 |

JAMES W. MOFFITT, Primary Examiner